United States Patent
Dummermuth

[15] 3,649,899
[45] Mar. 14, 1972

[54] FEEDRATE NUMERICAL CONTROL CONTOURING MACHINE INCLUDING MEANS TO PROVIDE EXCESS FEEDRATE

[72] Inventor: Ernst Dummermuth, East Cleveland, Ohio
[73] Assignee: Allen-Bradley Company, Milwaukee, Wis.
[22] Filed: Jan. 25, 1971
[21] Appl. No.: 109,317

[52] U.S. Cl............318/571, 318/603, 318/597, 235/151.11, 90/13
[51] Int. Cl......................................................G05b 19/24
[58] Field of Search............318/571, 597, 603; 235/151.11; 90/13

[56] References Cited

UNITED STATES PATENTS

| | | | |
|---|---|---|---|
| 3,110,865 | 11/1963 | Scuitto | 318/571 X |
| 3,122,691 | 2/1964 | Centner et al. | 318/571 |
| 3,344,260 | 9/1967 | Lukens | 318/571 X |
| 3,428,876 | 2/1969 | Kelling | 318/571 |
| 3,430,035 | 2/1969 | Read | 318/571 X |
| 3,590,226 | 6/1971 | Lane | 318/571 X |

*Primary Examiner*—T. E. Lynch
*Attorney*—Linderberg, Freilich & Wasserman

[57] ABSTRACT

A circuit arrangement is provided in a numerical control system such that the rate of motion command signals provided at the output of the contour generator for the numerical control system may exceed the input rate substantially.

10 Claims, 13 Drawing Figures

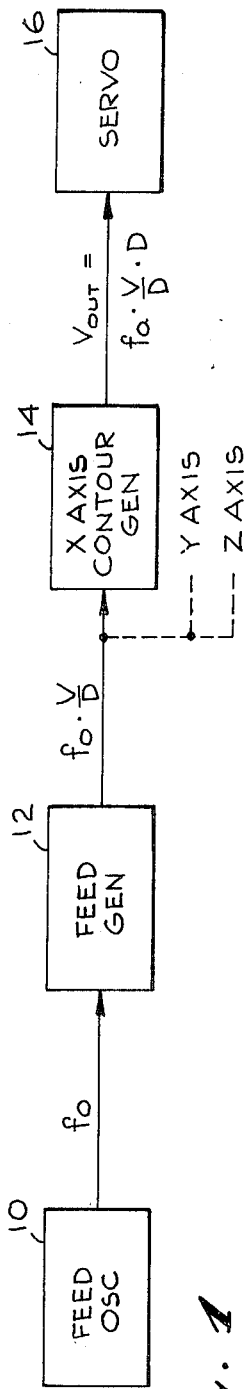
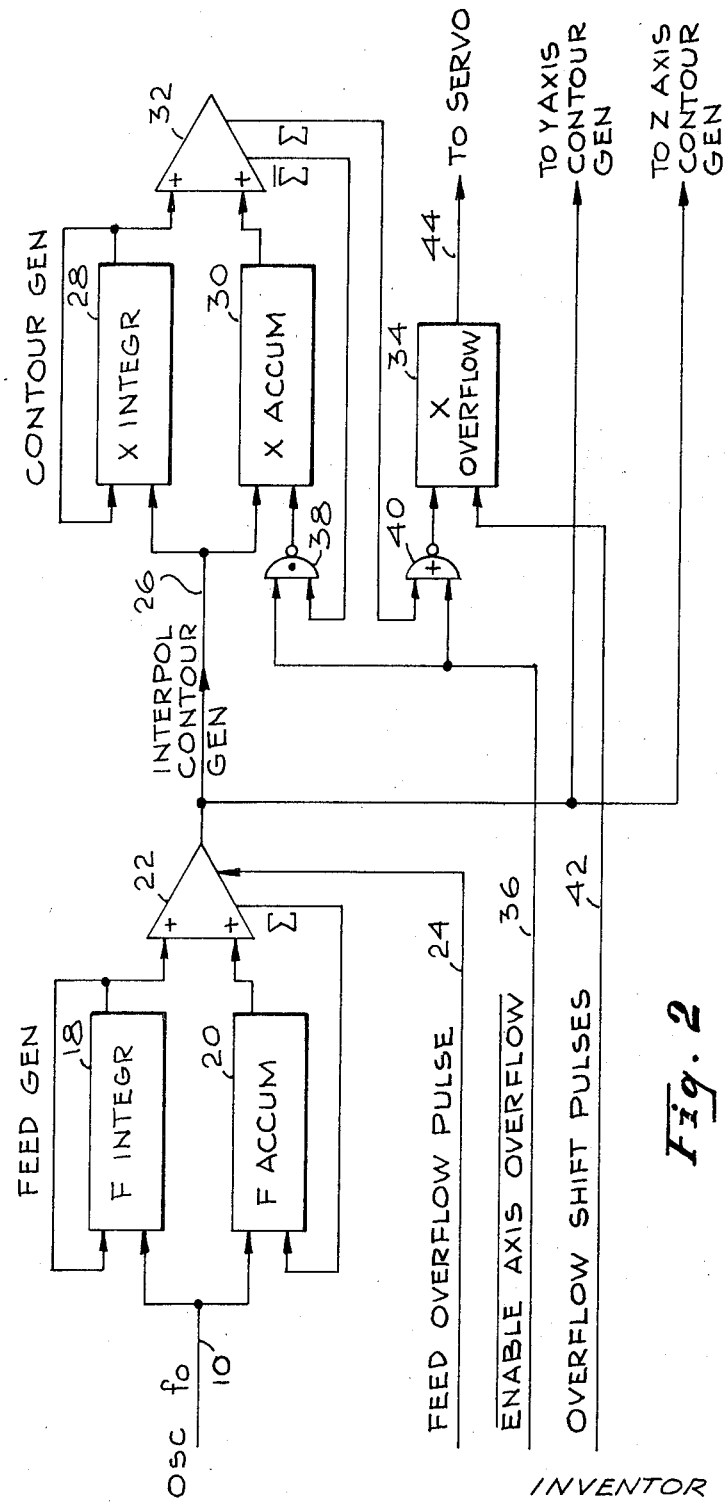
Fig. 1
Fig. 2
INVENTOR
ERNST DUMMERMUTH

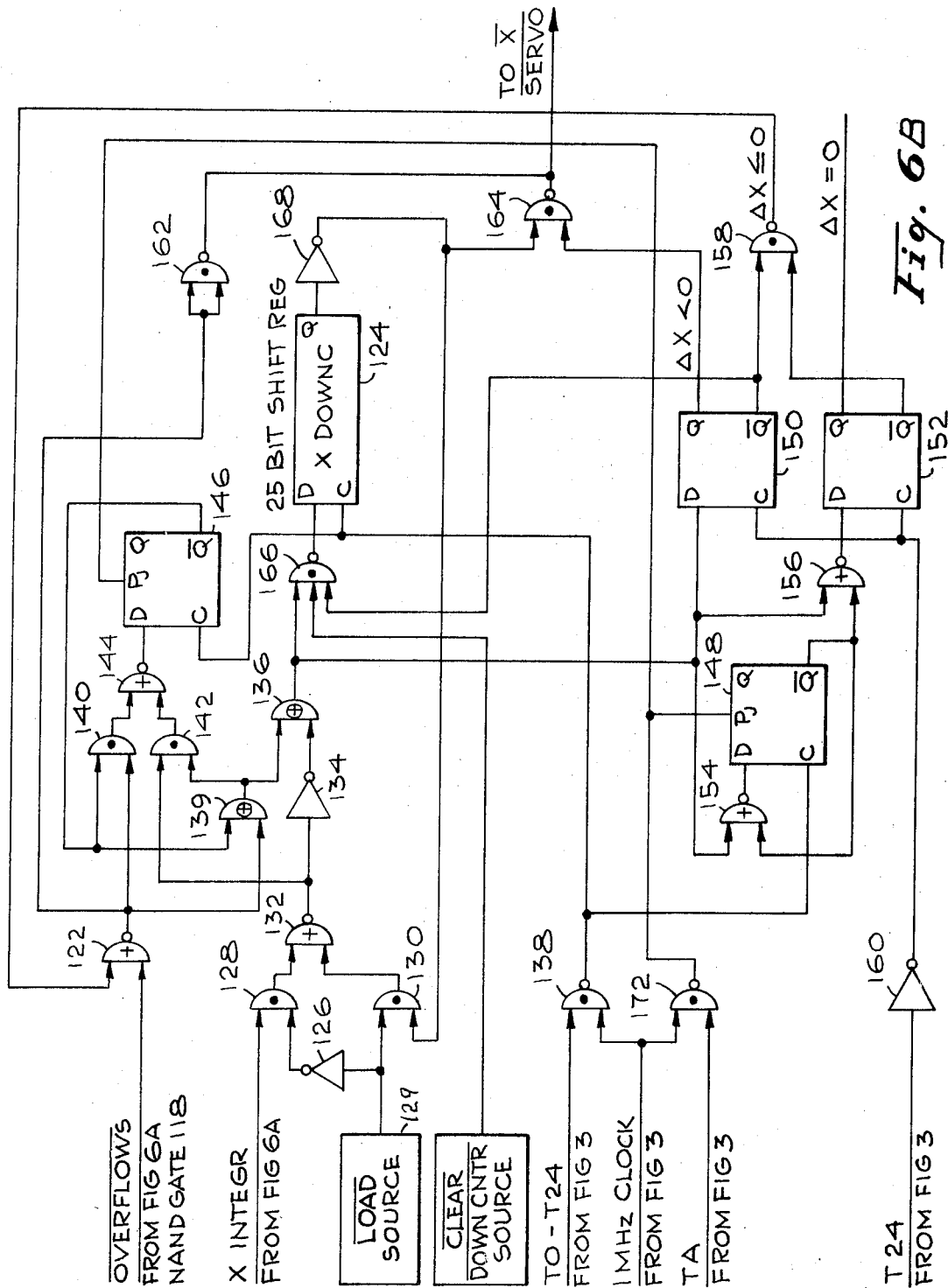

Fig. 7A

SAMPLE PROGRAM: X 20000 F 200000 (V = 400 IPM)

```
                                    MSB                          LSB
                                         F INTEGRAND
                                    [00000001100001101010000000]

FEED OVERFLOW PULSE
    LINE 24

7+12=19  {  |—7—|
                          |——12——|
                                         X INTEGRAND
                                    [000000000010011100010000000]

ENABLE AXIS OVERFLOW
    LINE 36

OVERFLOW SHIFT PULSES
    LINE 42                              LOAD            UNLOAD
TIME              T                 C24                  210 BA
    TIME AXIS FROM RIGHT TO LEFT  ←
```

Fig. 7B

SAMPLE PROGRAM: X 50000 F0 (RAPID TRAVERSE)

```
                                    MSB                          LSB
                                         F INTEGRAND
                                    [000000000000000000000000000]
                                    [111111111111111111111111111]

FEED OVERFLOW PULSE
    LINE 24
                                    |————18————|
                                         X INTEGRAND
                                    [00000000011000011010100000]

ENABLE AXIS OVERFLOW
    LINE 36

OVERFLOW SHIFT PULSES
    LINE 42                              LOAD            UNLOAD
TIME              T                 C24                  210 BA
    TIME AXIS FROM RIGHT TO LEFT  ←
```

INVENTOR
ERNST DUMMERMUTH
BY Lindenberg, Freilich & Wasserman

ATTORNEYS

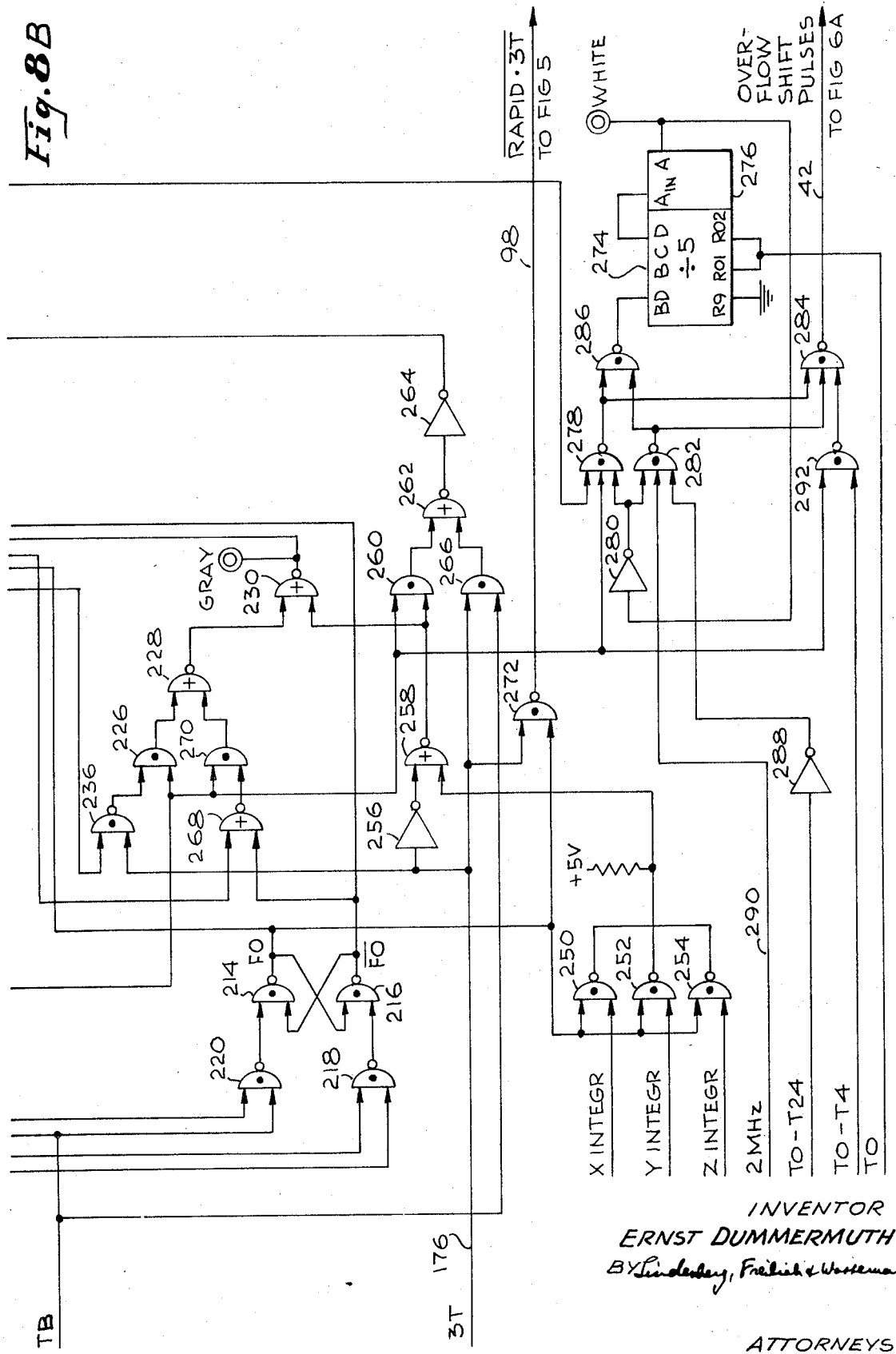

3,649,899

FEEDRATE NUMERICAL CONTROL CONTOURING MACHINE INCLUDING MEANS TO PROVIDE EXCESS FEEDRATE

BACKGROUND OF THE INVENTION

This invention relates to numerical control contouring machines and more particularly to improved feedrate and contour generating arrangements used therein.

Movement of a machine tool from one point to another is normally specified by three orthogonal components, $X$, $Y$ and $Z$. When these components are applied to a three axis contour generator, then the velocity of each axis is proportional to the magnitude of its component and the input frequency to the contour generator for that axis.

In order that the machine tool maintain a constant path velocity for any choice of $X$, $Y$ and $Z$, the input frequency to the contour generator must have the value of $f_o \cdot V/D$ where $f_o$ is a constant frequency which is selected, $V$ is the desired path velocity in inches per minute, and $D$ is computed from $X$, $Y$ and $Z$ and has the value $$D = \sqrt{X^2 + Y^2 + Z^2}.$$

The fraction $V/D$ is the term called the feedrate number, or FRN. For each set of axis commands, $X$, $Y$ and $Z$, the distance $D$ is computed and thereafter for a selected velocity the FRN is computed. This number is entered into the control system together with the axis information.

The conversion of numerical data into machine movement requires a feed oscillator $f_o$ which drives a feedrate generator which drives a contour generator. The contour generator output drives a servo motor. Each generator has the distinct property that the output frequency cannot exceed its input frequency. Circuits which provide this capability are known as rate multipliers or digital differential integrators. It is because of this property that the rate generators must be capable of accepting high input frequencies in order to achieve a desired output rate.

The maximum input frequency however depends upon the circuit configuration and the capabilities of the electronic components. As a result, the maximum output rate is also fixed. There are many occasions such as in a rapid traverse or rough cut operation, when it may be desirable to operate a machine tool at a higher rate of speed than possible because of the limitations of rate multipliers and contour generators.

OBJECTS AND SUMMARY OF THE INVENTION

A feature of this invention is to provide a numerical control system wherein the output rate of the contour generator may exceed its input rate substantially.

Another object of this invention is to overcome rate limitations imposed by the capabilities of the electronic components.

Yet another object of this invention is the provision of a novel and improved feedrate generator and contour generator for a numerical machine tool control system.

These and other objects of the invention are achieved by employing digital differential integrator circuits (hereinafter called DDI) for the feedrate generator and the contour generator. The contour generator produces incremental commands, the sum of which is equal to a binary number and is introduced into a register of the DDI called the integrand. The magnitude and the occurrence of these incremental outputs are proportional to the product of the freqeuncy $f_o$ of a clock signal applied to the DDI and the number in the DDI integrand register. The magnitude in particular is dependent upon the number of overflow bits assigned to the DDI's.

In an application filed by this invertor and assigned to this assignee, Ser. No. 96,120 filing date 12-8-70 (Atty's No. NC-002-70), there is described a system for obtaining overflow bits from a DDI in the form of a binary number, at the end of an iteration whereby acquisition of overflow is speeded up and the number of iteration cycles required for a DDI is reduced. This invention provides an improved arrangement for securing these overflow bits in the form of a binary number at the end of each iteration of the DDI, which speeds up the acquisition of the overflow and reduces the number of iteration cycles required and utilizes this technique for an improved rate multiplier and contour generating system.

Also, provision is made for performing a process called normalization wherein leading zeros in the feed command number, for example, are counted and a binary point is introduced so as to eliminate these leading zeros, resulting in a system which can operate at an increased speed. A similar binary point is also introduced into the axis command numbers.

The novel features of the invention are set forth with particularity in the appended claims. The invention should best be understood from the following description when read in conjunction with the accompanying drawings.

BRIEF DESCRIPTION OF THE DRAWINGS

FIG. 1 is a simplified block diagram of an NC machine;

FIG. 2 is a block diagram of a feed DDI and an axis DDI In cascade;

FIG. 6B is a circuit diagram of the axis downcounter used in this invention;

FIG. 7A is an illustration of the requirements for normalization in the $V/D$ mode;

FIG. 7B is an illustration of the requirements for normalization in the rapid mode;

FIGS. 8A and 8B are a circuit diagram of the normalization circuit used in this invention.

DESCRIPTION OF THE PREFERRED EMBODIMENTS

FIGURE I

Figure 4B:
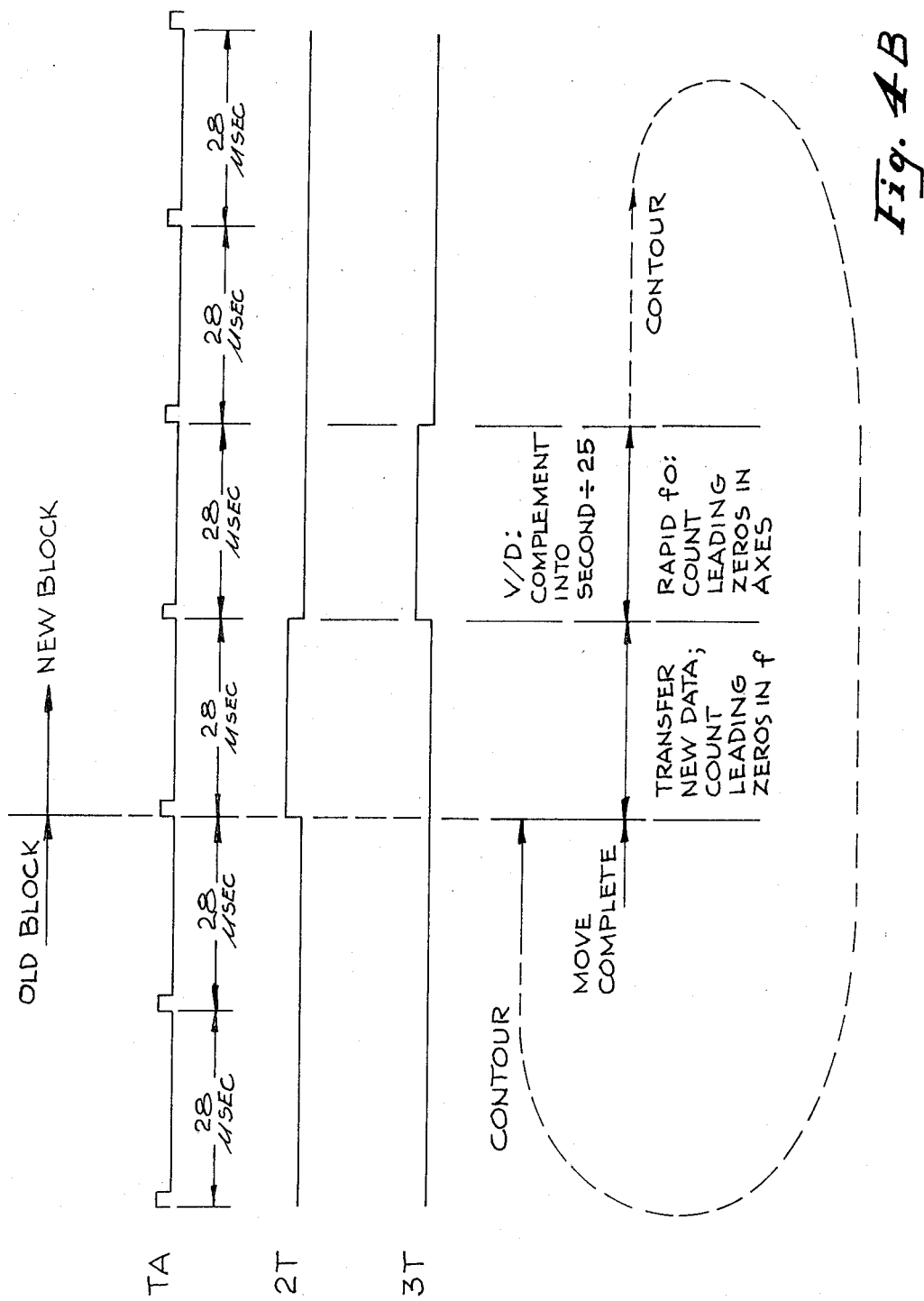
FIGS. 4A and 4B are timing diagrams illustrating the signals generated by the circuit of FIG. 3 required for operation of this system.

FIG. 1 shows a simplified block diagram for one axis of a numerical control machine provided to assist in an understanding of this invention. A feed oscillator 10 generates oscillations having an output frequency $f_o$. These are applied to the feed generator 12. The output of the feed generator in turn is used to drive a contour generator 14. Overflows from the contour generator 14 are applied to a servo system 16 which is used to drive the axis motor (not shown) of the machine tool.

FIGURE 2

FIG. 2 shows a simplified block diagram of the feedrate generator 12 and the contour generator 14. The feedrate generator includes a DDI which is composed of an integrand register 18, designated as F integrand and an accumulator register 20, designated as F accumulator, and an adder 22.

Upon the occurrence of an input pulse $f_o$, the contents of the integrand and accumulator are applied to the adder 22 to be added and the sum is placed into the accumulator. Serial binary arithmetic is employed. The respective register 18 and 20 are $n$-bit serial shift registers and the adder 18 is a single bit binary full adder. In order to maintain the contents of the integrand 18 its output is recirculated back into its input. The sum output of the adder is circulated into the accumulator at the most significant bit end while its contents are being shifted into the adder through its least significant bit end. The carry output of the adder is supplied as an input pulse to the DDI which is used as the contour generator.

The actual addition of the adder 22 is accomplished by a burst of $n$ shift pulses initiated for every $f_o$ pulse. A timing signal, designated as feed overflow pulse, is applied by a line 24 to interrogate a carry flip-flop which is part of the adder, and which will be shown in detail in FIG. 5. The feed overflow pulse occurs during the n shift pulses. By changing the occurrence of the feed overflow pulse 24, the accumulator essentially becomes a variable length register. If the carry flip-flop is set during the interrogation by the overflow pulse 24, an output pulse 26 will be sent to the contour generator.

The contour generator DDI is composed of an integrand register 28, an accumulator register 30 and an adder 32. Each interpolation pulse received from the carry flip-flop of the adder 22 initiates a burst of n shift pulses. The X integrand 28 circulates its contents from the least significant bit to the most significant bit end while applying them to the adder 32. The X accumulator 30 also enters it's contents into the adder. The adder $\overline{sum}$ output is circulated back into the most significant bit end of the accumulator through a NAND gate 38.

A five bit serial register 34 serves as an overflow register. If, during n shift pulses, the signal $\overline{\text{Enable Axis Overflow}}$ line 36, turns low, it serves to inhibit the NAND gate 38 to which it is connected and to enable NOR gate 40. The sum output of the adder 32 is no longer entered into the X accumulator. Instead, the sum output is entered into the X overflow 34 through the now enabled NOR gate 40. By changing the time of occurrence of the signal on line 36, the accumulator 30 can be made into a variable length register.

As soon as the $\overline{\text{Enable Axis Overflow}}$ signal on line 36 turns low, five shift pulses appear on line 42 to load the overflow register 34. Another five shift pulses appear on line 42 at a later time to unload the five bits into line 44, the output of the X overflow register. The generation of these timing signals are described further herein.

FIGURE 3

Figure 3:
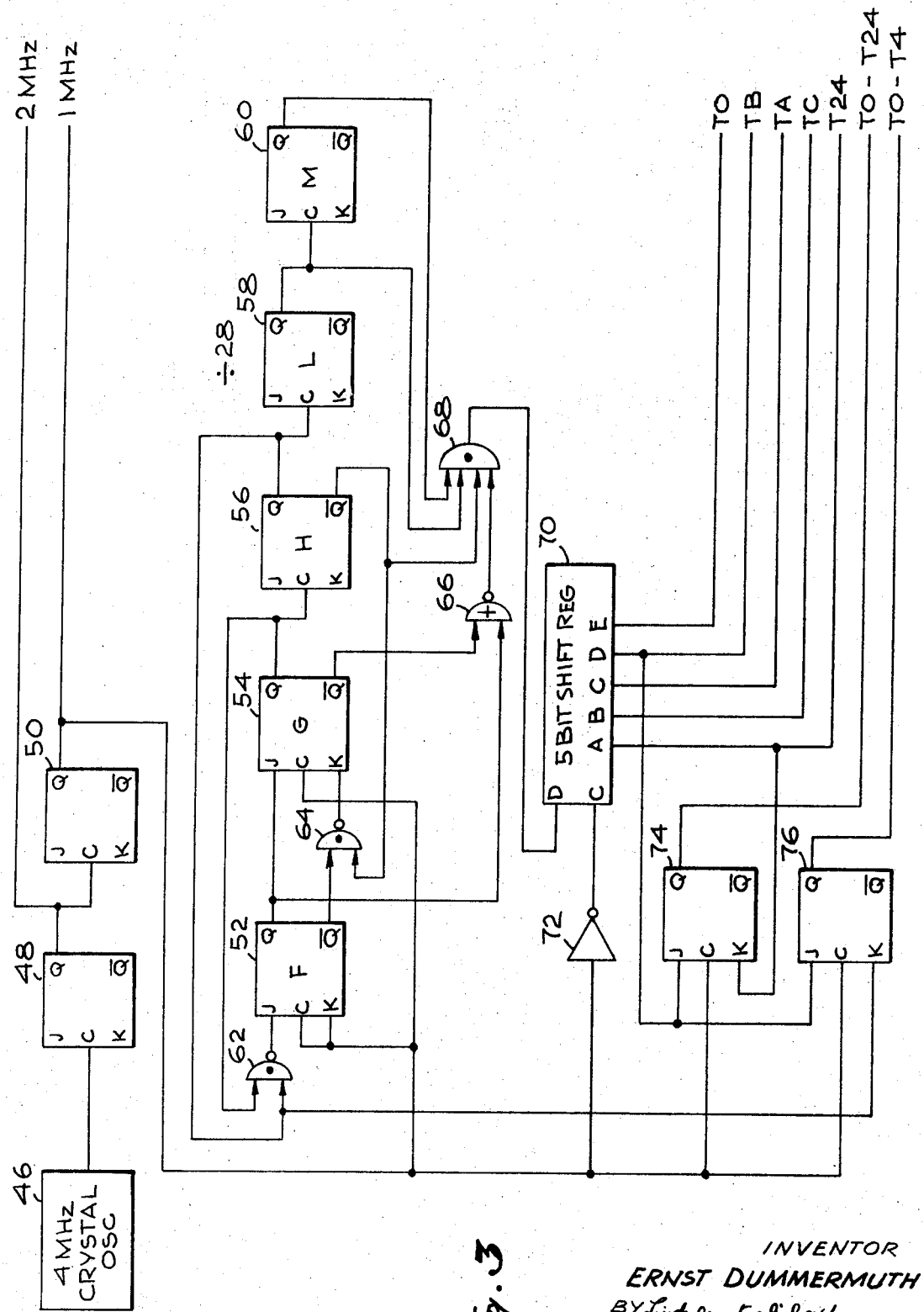
FIG. 3 is a circuit diagram of a timing generator employed with the invention.

FIG. 3 is a schematic diagram of a timing generator which is used with the embodiment of the invention, and FIG. 4 is a waveform diagram illustrating the time of occurrence of the various pulses generated by the timing generator.

For the purpose of illustration, and not by way of limitation upon the invention, let it be assumed that the registers used in the DDI are each 25 bits long and that the shift frequency is 1 MHz. Accordingly, each iteration pulse causes the generation of a burst of 25 shift pulses.

The timing circuit in FIG. 3 includes a 4 MHz. crystal oscillator 46 which drives two binary flip-flops respectively 48 and 50. The Q output of the first divider 48 is a 2 MHz. wavetrain and the Q output of the second divider 50 is a 1 MHz wavetrain. The 1 MHz. output is used to drive five flip-flops respectively 52, 54, 56, 58 and 60, which constitute a divide by 28 counter. Included in the counter, to enable the five flip-flops which normally divide by 32, to divide by 28, are a NAND gate 62, which feeds back the outputs of flip-flops 54 and 56 to the J input of flip-flop 52, and NAND gate 64, which receives inputs from the $\overline{Q}$ outputs of flip-flops 52, and 56 and feeds the K input to flip-flop 54.

A count of 23 is decoded by a NOR gate 66 and an AND gate 68. NOR gate 66 has the Q output of flip-flop 52 and the $\overline{Q}$ output of flip-flop 54 applied thereto. Its output is one input to AND gate 68. The other required inputs are the $\overline{Q}$ output of flip-flop 56, and the Q outputs of flip-flops 58 and 60. The 23 count output from the AND gate 68 is applied to the data input terminal of a five-bit shift register 70. Shift pulses are provided through an inverter 72 from the 1 MHz. output of the flip-flop 50.

An output is taken from each one of the stages of the five-bit shift register which are designated A, B, C, D and E. If the C output designated as TA, and as shown on FIG. 4, constitutes the beginning of an iteration cycle then, the other outputs from the shift register designated as T0, TB, TC and T24, have the relative times of occurrence indicated in FIG. 4A.

Flip-flop 74 is used to obtain a 25 μsec. shift interval T0–T24 and flip-flop 76 creates an interval T0–T4. Flip-flop 74 is a JK flip-flop with a 1 MHz. clock applied to its clock terminals, its J input terminal connected to the D output of the shift register 70 and its K input terminal connected to the A output shift register 70. Q output of the flip-flop constitutes T0–T24.

Flip-flop 76 has a 1 MHz. clock also and its J input is also connected to the D output of the shift register 70. Its K input is connected to the Q output of flip-flop 56 in the divide by 28 counter. The Q output of flip-flop 76 provides the interval T0–T4.

An iteration cycle takes 28 μsec. The first two microseconds and the last microsecond of each cycle are control times, whereas the actual shifting of the data occurs during the 25 microsecond shift interval.

Figure 4A:
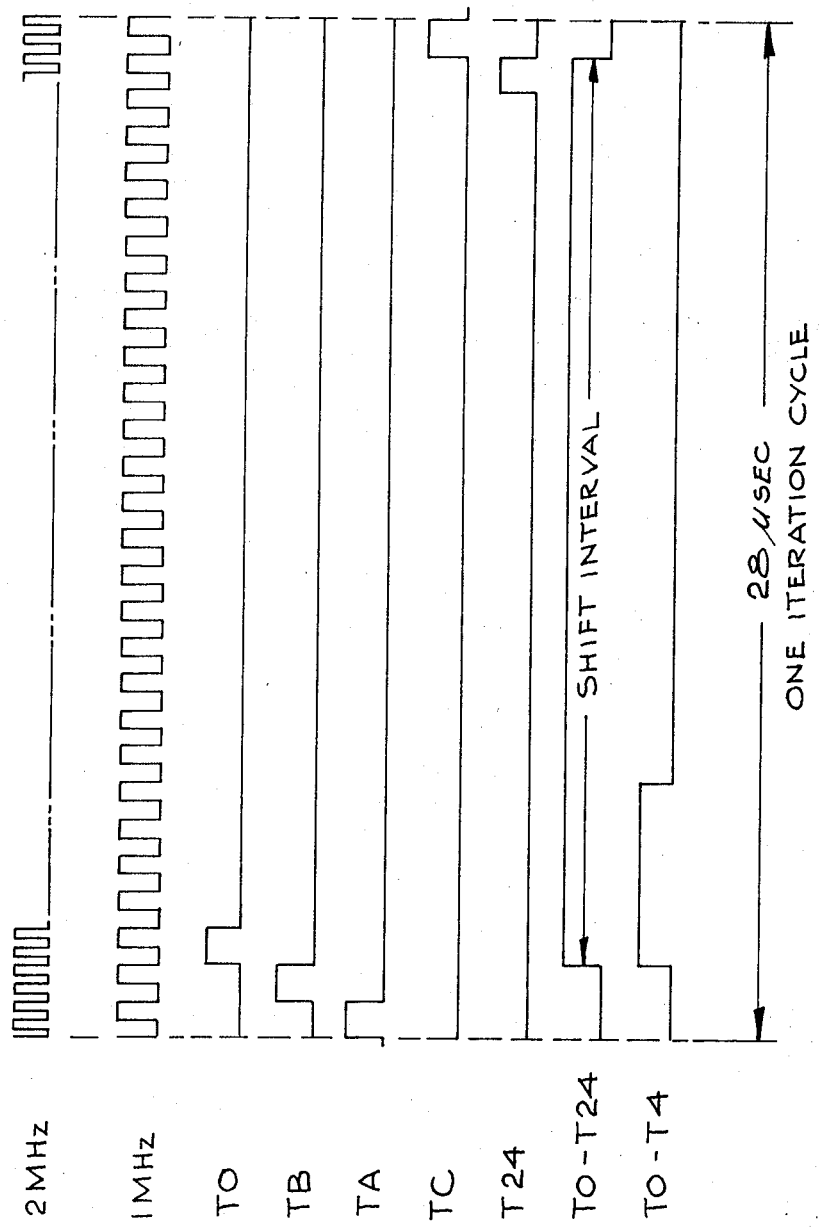

FIG. 4A is a timing diagram illustrating the relative times of occurrence and durations of the various timing signals generated by the circuit shown in FIG. 3. This starts with the 2 MHz. signal from which are derived the 1 MHz., to TB, TA, TC, T24, T0–T24 and T0–T4 signals.

Figure 8A:
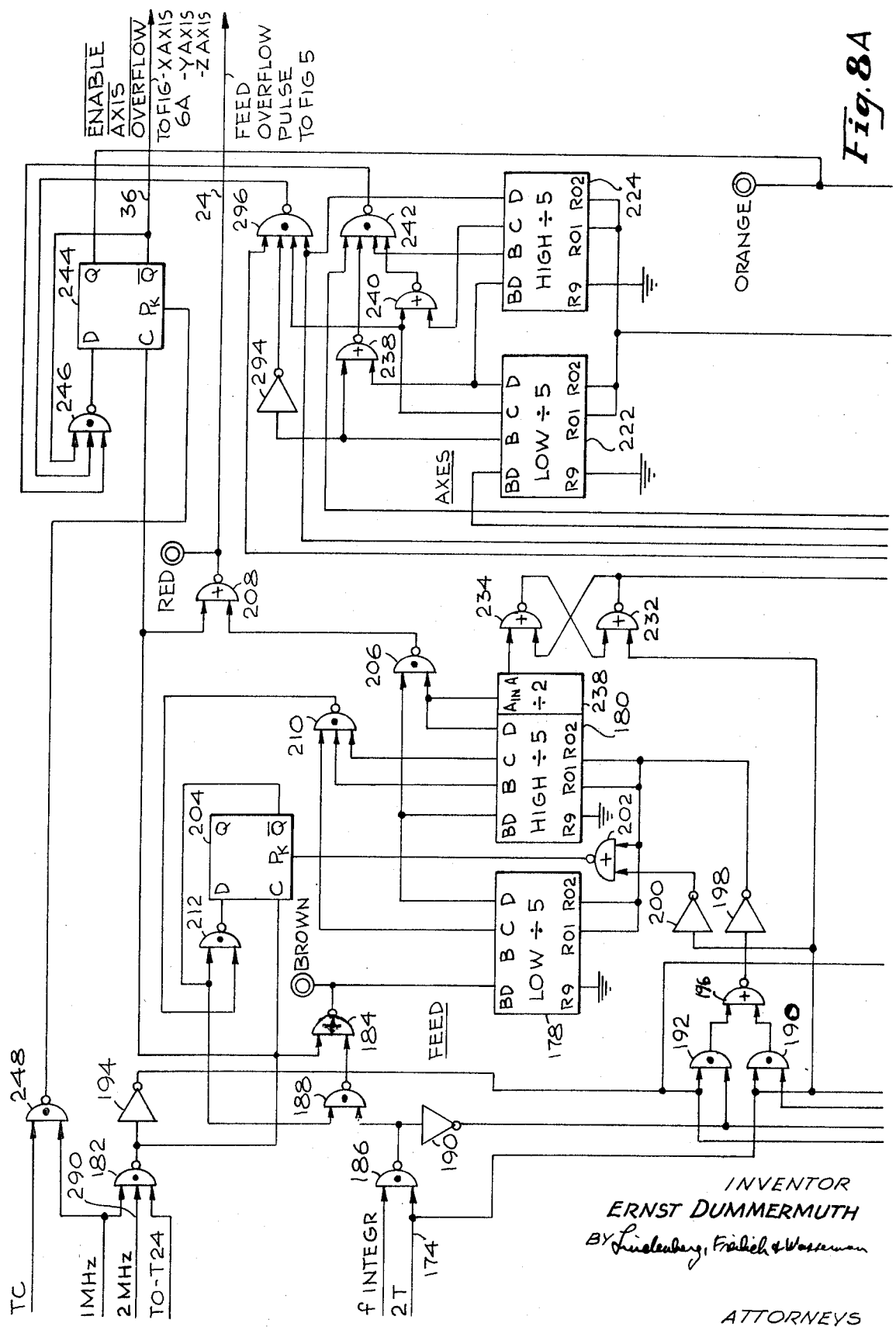

FIG. 4B illustrates the timing and duration of 2T and 3T timing signals which are used in FIGS. 8A and 8B herein. These are 28 μsec. signals. They are clocked by successive TA signals. 2T occurs upon the commencement of operation upon a new block of command data fed into the numerical control system. 3T occurs when 2T ends. At the end of 3T, as shown in the drawing, contouring occurs.

FIGURE 5

Figure 5:
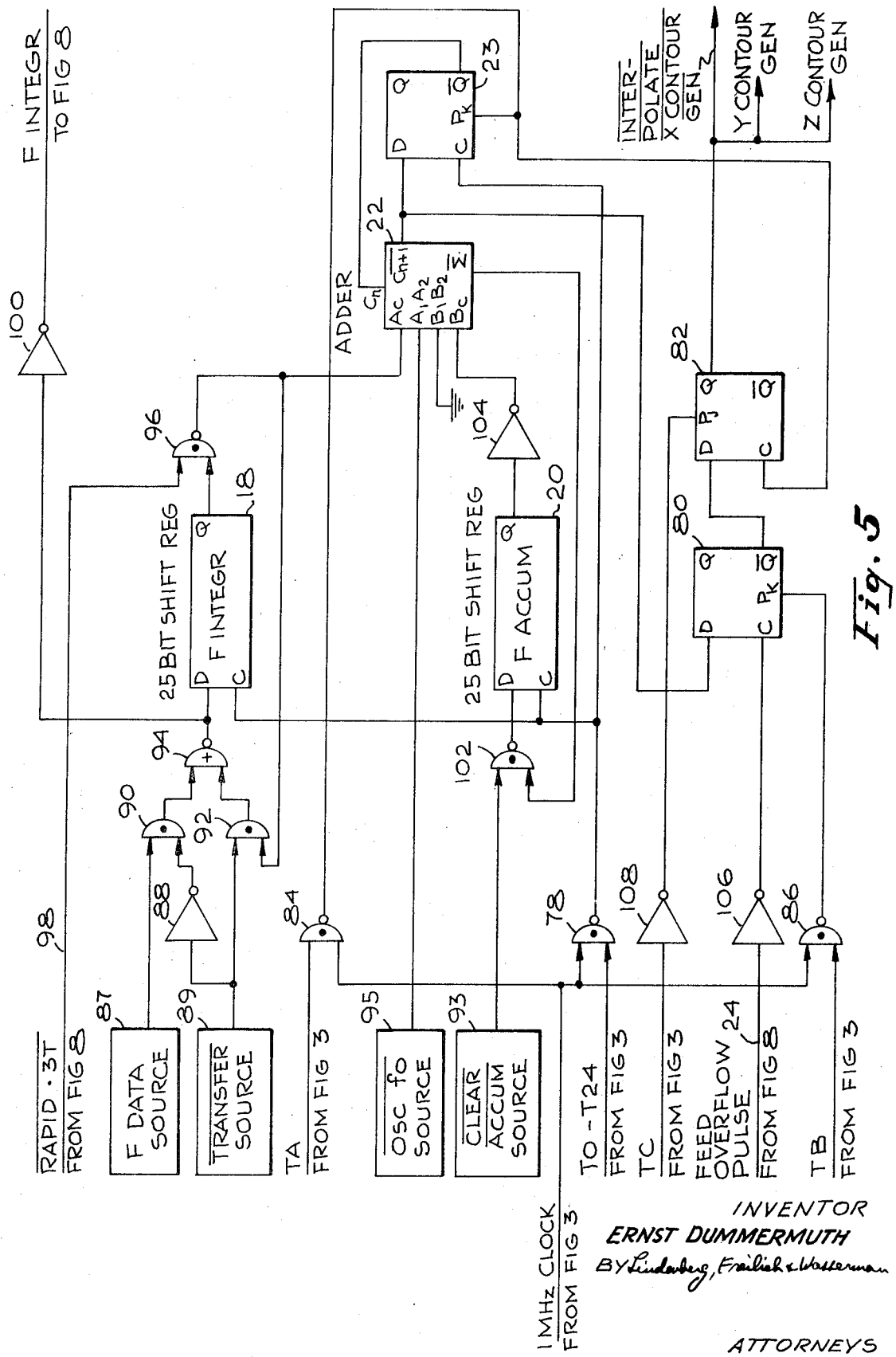
FIG. 5 is a circuit diagram of the feed generator used in this invention.

FIG. 5 is a more detailed block diagram of a feedrate generator in accordance with this invention. The clock or shift inputs to the F integrand and accumulator registers are received from a NAND gate 78. The two required inputs to the NAND gate are the 1 MHz. clock and the pulse T0–T24. The output of NAND gate 78 is also used as a clock input to the carry flip-flop 23 of the adder 22, whose other output is the carry overflow $\overline{C}_{n+1}$. A flip-flop 80, also receives the carry output $\overline{C}_{n+1}$ of the adder 22. This flip-flop is interrogated by a feed overflow pulse on bus 24, (From FIG. 8,) as described in connection with FIG. 2, which is applied through an inverter 106. The state of flip-flop 80 when interrogated, is transferred to flip-flop 82 by the connection between the $\overline{Q}$ output of flip-flop 80 and the D input of flip-flop 82. This transfer occurs at the end of control time TA, which is assured by applying the 1 MHz. clock signals and the TA signal to the inputs of a NAND gate 84. NAND gate 84 output serves to reset carry flip-flop 23 and to clock flip-flop 82.

NAND gate 86 receives as its input the 1 MHz. clock and a TB signal. The output of NAND gate 86 is used to reset flip-flop 80. The reset operation occurs during the second half of the TB pulse. Flip-flop 82 is preset during the TC interval which is applied to its preset input through an inverter 108.

Feedrate number data is transferred into the F integrand register 18 from a source 87, in the absence of a $\overline{\text{transfer}}$ signal (from a source 89) applied to an inverter 88, which enables AND gate 90 to transfer the data received on an F data line, through NOR gate 94 into the data input of the integrand 18. To circulate the data of the integrator 18, the AND gate 92 is enabled by the $\overline{\text{transfer}}$ signal and its output is applied to the NOR gate 94. The output of integrand 18 is applied to the NAND gate 96, whose output is applied to the adder 22 and to the AND gate 92. A Rapid · 3T signal (see FIG. 8) occurring on the line 98 acts to force the recirculate path of the F integrand to become ones. This occurs in the presence of a rapid transverse code.

It should be noted that the data in the integrand and accumulator registers are in their false state, that is all zeros are represented as ones and all ones as zeros. An inverter 100, which is connected to the data input terminal of the integrand register provides the true F integrand register data, as will be explained later, is to be used for normalization. Also, the output of NAND gate 96 converts the false data from the register into its true form for the adder.

When it is desired to clear the accumulator 20, then a $\overline{\text{clear}}$ accumulator signal (from a source 93) is applied to NAND gate 102 and is allowed to go low whereby all ones will be entered into the accumulator. The output of the accumulator is converted from its false to its true state by an inverter 104 connected between the accumulator least significant bit output and the input terminal of the adder 22.

In order to provide iteration, a low signal designated as oscill. $f_o$, (from a source 95) is applied to the A1, A2 terminal of the adder 22 for the interval T0–T24. As a result of $A_C$ input of the adder is enabled and the sum of the integrand and the accumulator appears at the $\overline{\Sigma}$ output of the adder and is entered into the front or most significant bit end of the accumulator. Simultaneously the integrand is recirculated through gates 96, 92 and 94. If no pulse is applied to the $A_1$, $A_2$ input to the adder 22, the input remains high and the data in both the integrand and the accumulator recirculate unmodified. That is, no addition occurs and the contents of both just continue to circulate until the line connected to the $A_1$, $A_2$ input goes low again during the succeeding T0–T24 interval. The DDI therefore circulates every 28 μsec. since the T0–T24 signal occurs once every 28 μsec.

Figure 6A:
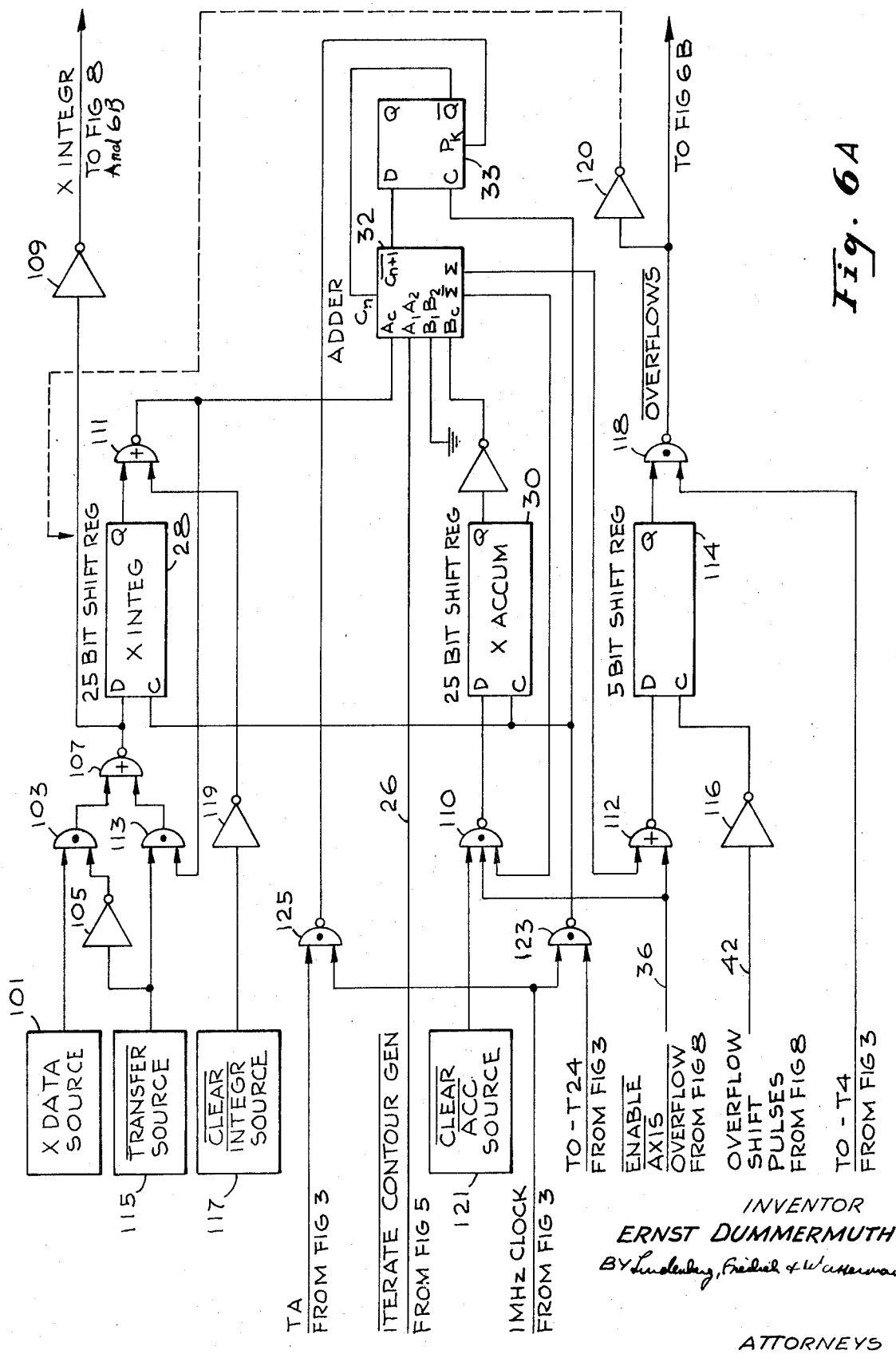
FIG. 6A is a circuit diagram of the contour generator used in this invention.

FIGURES 6A and 6B

FIGS. 6A and 6B are detailed block diagrams of the contour generator. As previously indicated, the contour generator includes an integrand register 28 and an accumulator register 30 which have their outputs connected to an adder 32. The adder 32 has a carry flip-flop 33. X axis data from a source 101 is entered into the X integrand through an AND gate 103, which is enabled by the output of an inverter 105 when in response to a transfer signal applied thereto goes low. The output of AND gate 103 is applied through NOR gate 107 to the data input of the X integrand at its most significant bit position. It should be noted that the data input to the integrand is also applied to an inverter 109 for the purpose of being made true and to determine the number of leading zeros, as will be described later.

The X integrand circulates its contents through a NOR gate 111, whose output is connected to the $A_C$ input of the adder 32 and also to the input to an AND gate 113. The other input to the AND gate 113 is a transfer applied from a source 115. In the presence of the transfer pulse, AND gate 113 is enabled and data can circulate back into the integrand register. If it is desired to clear the integrand, a clear integrand signal goes low. This low signal received from a source 117 is applied to an inverter 119, whose output is applied to NOR gate 111. The NOR gate input will remain high enabling only ones to be transferred into the integrand.

The iterate contour generator signal on bus 26 received from the feedrate generator (bus 26 goes low) enables an iteration to be performed. When the signal on bus 26 enables the adder, an addition can take place. Otherwise, the integrand register and the X accumulator just circulate their contents, in a manner similar to the one described for the feedrate generator DDI. The sum, provided by the adder 32, is circulated back into the accumulator 30 through a NAND gate 110 as long as the clear accumulator signal, received (from a source 12), and the enable axis signal (From FIG. 8) are both high. The clear accumulator signal, goes low to enable all ones to be entered into the X accumulator whereby it is cleared.

As soon as the enable axis overflow signal, (from FIG. 8), goes low, then the NAND gate 110 is disabled and NOR gate 112 is enabled to enter the sum output from the adder 32 into the data input terminal of a five-bit shift register 114. As a result, the accumulator 30 contains a fractional part of the sum whereas the five-bit overflow register 114 contains the whose part of the sum. The time of occurrence of the timing signal on line 36, (enable axis overflow from FIG. 8) determines the number of bits to be taken as a remainder or fractional part of the sum and thereby renders the accumulator as a variable length register.

As was the case for the feedrate DDI, both registers 28 and 30 contain false data. The overflow shift pulses on line 42, via the inverter 116, provide shift pulses for the shift register 114. As soon as line 36 turns low, a burst of five shift pulses occurs on line 42. Another five shift pulses occur on line 42 during the time T0–T4 whereby the contents of the 5-bit shift register are shifted out. NAND gate 118 is enabled by a T0–T4 signal to transfer therethrough the output of the five-bit shift register. The output of NAND gate 118 constitutes an overflow signal which is connected to an inverter 120 and to a NOR gate 122 in FIG. 6B.

Clock signals for shifting the integrand and accumulator registers are provided over the T0–T24 interval through a NAND gate 123, to which is also applied a 1 MHz. clock. Carry flip-flop 33 is reset by the output of a NAND gate 125 in the presence of a TA signal and a 1 MHz. clock signal.

In FIG. 6B, a downcount shift register 124 is loaded with the X integrand number, from FIG. 6A, inverter 109. The X integrand number represents the distance desired for the machine tool to move along the X axis. The method of loading is to apply the X integrand number to an AND gate 128 which is enabled when a load signal received from a source 129 and applied to an inverter 126 goes low. The output of the AND gate 128 is applied to a NOR gate 132. The NOR gate output is applied to an inverter 134 whose output is applied to an exclusive OR gate 136. The output of the exclusive OR gate 136 is applied to a NAND gate 166 whose output is applied to the data input terminal of the downcounter 124.

The downcounter 124 is a 25-bit shift register which is shifted during the T0–T24 interval by the 1 MHz. clock pulses applied thereto through a NAND gate 138. NAND gate 138 also drives the clock input of borrow flip-flop 146. As the shift register 124 is shifted, its output is applied to the inverter 168, whose output is applied to the AND gate 130. AND gate 130 is enabled when the load signal from a source 129 is high. The output of AND gate 130 is applied to the NOR gate 132, whose output, besides being applied to the inverter 134 is also applied to an AND gate 142. Whether or not AND gate 142 is enabled is determined by the output of an exclusive OR gate 139.

The overflow from the contour generator DDI constitutes one input to the exclusive OR gate 139 and is also applied to an AND gate 140. The output from AND gate 140 is applied to a NOR gate 144. Another AND gate 142 receives the output of NOR gate 132 as well as the output of exclusive OR gate 139. NOR gate 144 receives the output of AND gates 140 and 142. The output of NOR gate 144 is applied to the D input terminal of flip-flop 146. Flip-flop 146 is initiated to its set state by each 1 MHz. clock pulse from NAND gate 172 during the TA interval.

The logical arrangement just described constitutes a serial binary subtraction circuit whereby each time overflows are generated the number in the downcounter is decremented the proper amount. This occurs by reason of the fact that the overflow from NAND gate 118 (FIG. 6A) is timed to occur during the T0–T4 pulse interval which is the interval during which corresponding binary bits in the number in the X downcounter are being shifted out. Before a subtraction is performed borrow flip-flop 146 is cleared during the control time TA at the $P_j$ input providing a low at the $\overline{Q}$ output (no borrow). The binary subtractor, composed of the devices 134, 136, 139, 140, 142, 144 and 146 follows this truth table to perform A–B.

| Min. A | Subtr. B | Borrow In | Differ. | Borrow Out |
|---|---|---|---|---|
| 0 | 0 | 0 | 0 | 0 |
| 0 | 0 | 1 | 0 | 1 |
| 0 | 1 | 0 | 1 | 1 |
| 0 | 1 | 1 | 0 | 1 |
| 1 | 0 | 0 | 1 | 0 |
| 1 | 0 | 1 | 0 | 0 |
| 1 | 1 | 0 | 0 | 0 |
| 1 | 1 | 1 | 1 | 1 |

The minuend A is provided at the output of NOR gate 132 as $\overline{A}$, the subtrahend B (the overflows from the contour generator) is provided as B at the output of NOR gate 122. The difference appears at the output of gate 136 (true), whereas a borrow out appears at the output of gate 144 (false). The borrow out is then delayed in flip-flop 146 and is applied to the next higher bit in gates 139 and 140 as borrow in.

Flip-flop 148, 150 and 152 and gates 154, 156 and 158, together with the inverter 160 test the contents of the downcounter respectively for $\Delta X \leq 0$, $\Delta X=0$, $\Delta X<0$. In particular, flip-flop 148 checks for zeros in the bits 0 to 23. This flip-flop is initially preset at the TA interval by receiving an output from a NAND gate 172, which receives the TA and 1 MHz. signals. During the T0–T24 interval, 1 MHz. clock pulses are applied to the C input of this flip-flop. The D input to the flip-flop has connected thereto a NOR gate 154 which has as one input the $\overline{Q}$ output of the flip-flop and as the other input the output of exclusive OR gate 136 (Difference). Exclusive OR gate 136 is in the recirculating path of the downcounter 124. If a one-bit signal occurs at the output of exclusive OR gate 136, flip-flop 148 is clocked to its reset state. Once in the reset state the flip-flop is latched via the connection from its $\overline{Q}$ output to NOR gate 154. In other words, flip-flop 148 remains preset only if the data train of gate 136 contains no logic one during T0 to T23.

Flip-flop 150 and 152 are clocked by a T24 clock pulse applied through an inverter 160 to their C input. As a result, flip-flop 150 stores the data which is present at gate 136 during T24. Since the T24 clock pulse coincides with the highest bit position (sign bit), flip-flop 150 gets set if there is a one in the highest bit position indicating that a negative number just has been entered into the downcounter ($\Delta X<0$). Flip-flop 152 checks for a zero in the highest bit position, of the data taken from gate 136 and applied through NOR gate 156, and in addition the state of flip-flop 148 is applied to NOR gate 156. As a result, flip-flop 152 gets set only if all 25 data bits contained zero ($\Delta X=0$).

The output of NAND gate 158 goes high if flip-flop 150 ($\Delta X<0$) or flip-flop 152 ($\Delta X=0$) goes high. Therefore the output of gate 158 ($\Delta X \leq 0$) blocks NOR gate 122 which in turn blocks NAND gate 162 from providing overflows to the servo.

If flip-flop 150 is set ($\Delta X<0$) an overmodulation of the servo did occur. It must be realized that the negative number in the downcounter specifies the amount of overmodulation. If this negative number is also sent to the servo, a modulation in reverse direction takes place removing the excess modulation.

To achieve this operation the Q output of flip-flop 150 is connected to NAND gate 164. The second input of gate 164 is taken from the LSB of the downcounter (inverter 168 provides true data at its output). As a result the contents of the downcounter (containing a negative number) is sent to the servo.

The $\overline{Q}$ output of flip-flop 150 is also connected to NAND gate 166. The downcounter is therefore cleared by entering all ones into the MSB whereas the above mentioned negative contents exits the downcounter via the LSB. The negative number is therefore sent to the servo only once.

After the downcounter is cleared flip-flop 152 responds indicating the completeness of the move ($\Delta X=0$).

The downcounter can also be cleared from an external source by applying a low to the center leg of NAND gate 166.
FIGURES 7A and 7B FIGS. 7A and 7B are drawings which are shown to assist in an understanding of the timing of the occurrence of the feed overflow pulse which occurs on bus 24, the enable axis overflow pulse which occurs on bus 36, and the overflow shift pulses which occur on bus 42. A circuit for generating these pulses is shown in FIG. 8.

In FIG. 7A the respective timing signals 24, 36 and 42 are shown in relation to the contents of the feed- and axis- integrands. The real time axis extends from right to left as data is shifted LSB first. To understand these timing signals, the block diagram of FIG. 1 is used to write the equation $$V_{out} = f_0 \cdot V/D \cdot D$$

$V$ is the desired velocity in inches per minute and $V_{out}$ is the actual output velocity. It is the purpose of the normalization to make $$V_{out} = V$$

Under an assumption that the axis distance D is expressed in $10^{-4}$ inches and the feedrate number $V/D$ is expressed in $10^{-3}$ 1/minute and taking into consideration that the integrands and accumulators are 25 bits long, the following equation is written with $f_0=35.714285$ kHz. (1/28 $\mu$sec.).

$$V_{out} = 35.7 \text{ kHz} \cdot \frac{V \cdot 10^3}{D \cdot 2^{25}} \cdot \frac{D \cdot 10^4}{2^{25}} \cdot N \text{ (pulses per second)}$$

If only the overflow of a 25-bit accumulator is taken, the accumulator functions as a $2^{25}$.
Converting this equation into inches per minute, we have:

$$V_{out} = 35.7 \ldots V \cdot 10^3 \cdot \frac{10^7}{2^{50}} \cdot \frac{60}{10^4} \cdot N$$

$$= 2.14 \ldots \cdot V \frac{10^9}{2^{50}} \cdot N; \ 10^9 \approx 0.93 \cdot 2^{30}$$

$$= 2.14 \ldots \cdot 0.93 \cdot V \cdot \frac{2^{30}}{2^{50}} \cdot N$$

$$= 2.0 \cdot V \cdot \frac{1}{2^{20}} \cdot N$$

$$V_{out} = V \cdot \frac{1}{2^{19}} \cdot N \quad \underline{\underline{N=2^{19}}}$$

$$V_{out} = V \text{ (with } N=2^{19}\text{)}$$

As a result of this computation, the register length of the feed- and axis accumulators must be shortened a total of 19 bits in order to obtain a multiplication by $2^{19}$.

Referring back to the example of FIG. 7A, the feed overflow pulse occurs seven pulses prior to the end of the shift interval shortening the feed accumulator by seven bits. The overflows for the axis are taken 12 pulses prior to the end of the shift cycle shortening the axis accumulator by 12 bits, totaling a normalization of 19 bits.

It must be realized that the occurrence of the timing signal 24 is dependent upon the magnitude of the $f$ integrand. Since only one bit overflow is taken from the $f$ accumulator, the timing signal 24 must occur any time after the most significant "1" of the $f$ integrand. In order to achieve the highest possible normalization signal 24 is placed directly after the most significant "1" of the $f$ integrand as shown in FIG. 7A, multiplying the output rate of the feed generator by $2^7$.

After the normalization for the feed generator (in the example seven bits) is specified, the timing signal 36 is created to complete the normalization to 19 bits. For the example of FIG. 7A, it can readily be seen that the effective bit length of the axis accumulator (remainder) is less than the size of the axis integrand generating multiple bit overflows. The overflow shift pulses line 42 are related to the signal line 36 as shown in FIG. 7A.

FIG. 7B explains the normalization for a rapid traverse code $f0$. After detecting that the contents of the $f$ integrand is zero, it will be replaced by all "1's." The occurrence of the timing signal line 24 is of no significance. Since a hardware counter limits the feed normalization at a count of 18, the pulse of line 24 is defined as shown in FIG. 7B.

The normalization of the axis DDI is independent of the feed normalization. The timing signal 36 goes low two shift pulses prior to the most significant "1" of the axis integrand. This normalization yields a rapid traverse rate of 425 to 850 IPM depending upon the data a pattern of the integrand.
FIGURES 8A and 8B The circuit which produces the timing signals shown in FIGS. 7A and 7B, is shown on FIGS. 8A and 8B. Each time new data is transferred into the $f$ and $X$ integrand, a timing signal 2T (line 174) is applied.

This signal lasts one recirculation cycle ($28\mu$). Following the 2T signal another timing signal 3T is applied to a line 176, which is also $28\mu$ wide. (see FIGS. 4B for 2T and 3T signals). During the 2T interval the leading zeros in the $f$ integrand are counted in two cascaded divide by five counter circuits respectively 178 and 180, constituting a divide by 25 counter. The count clock is provided by applying 1 MHz., 2 MHz. and T0–T24 signals to a NAND gate 182. Its output is applied to an inverter, 194, whose output is applied as one input to an AND gate, 192. *f* integrand data signals enable AND gate 192. The *f* integrand data is applied to a NAND gate 186 which is enabled by the 2T clock pulse. The output of NAND gate 186 is inverted by inverter 190 and applied to AND gate 192. The output of AND gate 192 is applied to a NOR gate 196, whose output is inverted by inverter 198 and connected to the reset input of divide by five counters 178 and 180. Thus, each time a 0 occurs in the *f* integrand data, the counters 178 and 180 are advanced by 1 via input through NAND gates 186, 188 and NOR gate 184, and each time a 1 occurs the counters are reset. A second input to NOR gate 196 is obtained from the output of an AND gate 190 to whose inputs both the 2T and TB signals are applied.

Since data is supplied serially, least significant bit first to the counters, the state of the counters 178 and 180 after a 2T interval is indicative of the number of leading 0's in the *f* integrand. If we consider the example shown in FIG. 7A, the counter will hold, at the end of the 2T interval, a count of seven.

When the counter 178, 180 counts to 17 this is detected by NAND gate 210. The output of NAND gate 210 via NAND gate 212, sets flip-flop 204 which disables NAND gate 188 thereby terminating the count of leading zeros. This limits feedrate normalization to 18 places at most. The 2T interval causes an inverter 200 to apply a low signal to a NOR gate 202 whose output releases the reset input of flip-flop 204. As a result, the upper leg of NAND gate 188 can only be disabled during 2T and after reaching the count of 18.

Except for the 2T interval the two counters 178 and 180 receive 25 pulses per iteration and thus cycle every 28 $\mu$sec. Since the counters have been preset to a count of seven, according to the example of FIG. 7A on the next iteration they overflow after 18 shift pulses. Such overflow is detected by a NAND gate 206 whose output is applied to a NOR gate 208. The other input to gate 208 is the pulse train from NAND gate 182. The output of NOR gate 208 constitutes the feed overflow pulse applied to line 24.

A rapid traverse code is detected in the cross coupled NAND gates 214 and 216, which effectively constitute a flip-flop circuit. At control time 2T·TB, NAND gate 220 applies its output to NAND gate 214 thereby setting the flip-flop with its FO output state high. NAND gate 218, which has as one input the clock output of inverter 194 and the other input the output of inverter 190, can provide an output whenever a 1 occurs during 2T in the *f* integrand number. The output of NAND gate 218 is applied to NAND gate 216 causing an $\overline{FO}$ output. Thus, a single 1 in the integrand number sets the flip-flop 214, 216 so that its $\overline{FO}$ output is high, indicative of the fact that a rapid traverse code is not present.

If a non-zero feed number has been detected, as is the case exemplified in FIG. 7A, the normalization of the axis integrand DDI occurs during 3T time. A second counter composed of two divide by five counters 222 and 224 is enabled and has count pulses applied thereto from an AND gate 226 which receives clock pulses. The output of AND gate 226 is applied to a NOR gate 228, whose output drives another NOR gate 230, whose output constitutes the input to the counter 222, 224, to be counted. Whether or not AND gate 226 can pass clock pulses is determined by the state of the flip-flop, consisting of two cross coupled NOR gates 232, 234, whose output is applied to a NAND gate 236 whose output in turn enables the AND gate 226. The other input to NAND gate 236 is a 3T pulse. The NOR flip-flop 232, 234 is set by the output of an overflow flip-flop 238, which is driven when the counter 178, 180 overflows.

In operation, the axis counter 222, 224 is preset during 3T to the complement of the count of the feedcounter 178, 180. Recalling that the feedcounter was preset to a count of seven during 2T, and that it recirculates beginning with 3T, it takes 18 pulses during 3T for flip-flop 238 to detect an overflow and set NOR flip-flop 232, 234. When NOR flip-flop 232, 234 is set it disables AND gate 226. At that time, axis counter 222, 224 has a count of 18. After the 3T interval is terminated, axis counter 222, 224 is also connected for dynamic recirculation by enabling AND gate 226 again.

From the discussion in connection with FIG. 7A, it should be appreciated that the enable axis overflow signal on line 36 must appear 12 pulses prior to the end of a shift cycle (or 13 pulses after the beginning of a shift cycle). Recalling that the axis counter 222, 224 has been preset to a count of 18, it will overflow after seven shift pulses have been applied and thereafter starts counting anew. By decoding when the new count of five occurs, a total of 12 shift pulses will have been counted. A count of five is decoded by NOR gates 238 and 240 and NAND gate 242, which have their inputs connected to the outputs of the counters 222, 224. The output of NAND gate 242 is applied to the D input of the flip-flop 244 via a NAND gate 246. The flip-flop 244 is driven to its set state thereby removing the high or enable axis overflow signal from line 36. Thus, axis overflow is enabled to occur.

Normalization for the rapid traverse code is different. The axis counter 222, 224 is preset according to the number of leading zeros in the axis integrands. Upon detecting the FO code, which is the output of NAND flip-flop 214, 216, NAND gates 250, 252 and 254 are qualified. These NAND gates serve to test all axes simultaneously. The axis counter 222, 224 is advanced for a 0 in the data train of all axes and reset for a 1 in the data train of any one of the axes. This occurs during 3T time. Inverter 256 enables NOR gate 258 which can then pass a 1 to AND gate 260 whose other input constitutes clock pulses. The output of AND gate 260 is applied to a NOR gate 262. Its output is applied through inverter 264 whose output will reset the counter 222, 224 each time a one occurs. Each time a zero occurs NOR gate 258 enables NOR gate 230 which can then pass a clock pulse to the counter to be counted. and gate 266 provides an output to reset the counter during 3T·TB time. Normalization is limited to a count of 20 by applying the 20th count output of the counter 222, 224 (D terminal of 224) to a NOR gate 268. The other input of gate 268 is connected to the $\overline{FO}$ output of flip-flop 214, 216. The output of NOR gate 268 is applied to AND gate 270 causing it to become inhibited whereby the clock pulses are no longer passed to the counter through NOR gates 228 and 230 to cause its count to be advanced. A signal rapid·3T is generated by NAND gate 272 in response to the $\overline{FO}$ output of flip-flop 214, 216 and a 3T signal. Rapid·3T signal replaces the feed integrand number with all ones. A desired rapid traverse range is determined by selecting a particular counting stage of the counter 222, 224 in NAND gate 296. For example, inverter 294 and NAND gate 296 decode the state of 22 of the counter 222, 224 for a 425 IPM to 800 IPM range, depending upon the date pattern of the integrand.

FIG. 7B shows the signal pattern for 425 IPM to 850 IPM range. The integrand contains nine leading zeros and reaches the count of nine during 3T. During the next cycles the D input of flip-flop 244 must be qualified after the 13th shift pulse. The counter by then has reached a count of (9+13) 22. Therefore NAND gate 296 decodes the counting stage 22. By decoding e.g., the counting stage 24 line 36 falls low two pulse times later yielding a 106.25 IPM to 212.5 IPM range.

The velocities are computed from the fact that a single bit at a repetition rate of 33.333 kHz. produces 200 IPM at a resolution of $10^{-4}$ inches per bit.

$$33.333 \cdot 10^3 \cdot 60/10^4 = 200 \text{ IPM}$$

The repetition rate assumed by way of example for this system is 35.714 kHz. (1/28 places) introduces a multiplication by $\mu$sec). The feedrate generator (normalized 18 by 127/128 and the two-bit overflow with an integrand filled with all ones from its MSB downwards introduces a multiplication by 4. Therefore we have $35.714 \cdot 127/128 \cdot 4 \cdot (10^3 \cdot 60/10^4) = 850.44$ IPM.

Overflow shift pulses in feed as well as in rapid mode, which are applied to line 42 are generated using a divide by 5 counter 274 and a carry flip-flop 276 (FIG. 8B). A T0 timing signal resets the counter. As soon as the enable axis overflow line 36 is qualified, the Q output of flip-flop 244 goes high. This enables NAND gate 278. Since the counter 274 was reset, output A of flip-flop 276 is low and this signal is applied to an inverter 280 whose output qualifies NAND gates 278 and 282. Shift pulses applied to NAND gate 278 can then be applied therefrom to a NAND gate 284. The output of NAND gate 284 constitutes the overflow shift pulses applied to line 42.

NAND gate 286, which also receives the output of NAND gate 278 applies the shift pulses to the divide by five counter causing it to count. Upon the occurrence of the fifth count, flip-flop 276 is set causing its A output to go high whereby NAND gates 278, 282 are no longer qualified. The five shift pulses just described comprise the load phase of the five-bit overflow register. If the shift cycle terminates before the completion of these five pulses, additional pulses are introduced during the control time via inverter 288 and NAND gate 282.

In order to unload the overflow register, during the T0-T4 interval, a NAND gate 292 is enabled to pass clock pulses to NAND gate 284. Since the duration of the T0-T4 clock time is 5 microseconds, five pulses are applied to the overflow shift pulse line 42.

FIGURE 9

Figure 9:
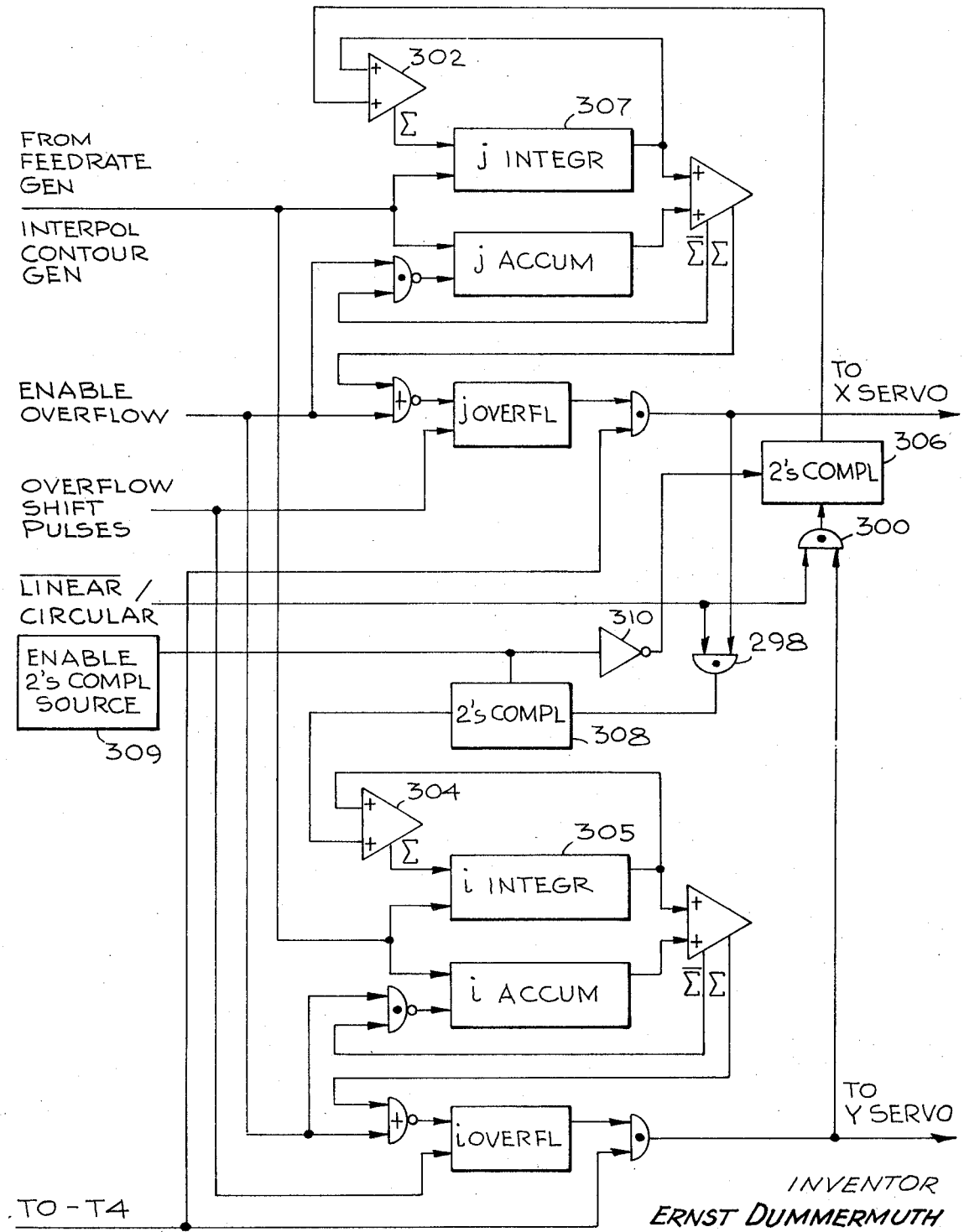
FIG. 9 is a block diagram of a linear and circular interpolation system in accordance with this invention.

FIG. 9 is a simplified block diagram in accordance with this invention of a two axis contour generator for a numerical control system which may be operated in either linear or circular mode. There are shown two contour generators of the type shown in FIG. 6A herein. An AND gate 298 is used to feed the *j* overflow data from the *X* axis through a two's complementor 308 into an adder 304, which has as its other input feedback from the output of the *i* integrand 305. An AND gate 300 feeds the *i* overflow data from the *y* axis through a two's complementor 36 into an adder 302. The other input to the adder is the feedback from the *j* integrand 307. Whether or not such cross feed occurs is determined by a signal designated as linear/circular, applied to the other inputs to these AND gates. Thus in the presence of the circular signal such cross feed occurs. In the absence of the circular signal such cross feed does not occur and the two DDI's operate in the manner previously described for the linear mode.

For proper circular operation either the output of NAND gate 300 or the output of NAND gate 298 must be complemented depending upon the sense of rotation. The complementing circuits are enabled in the alternative by the application or the withholding of an "enable two's complement" signal from a source 309 which is directly applied to two's complementor 308 and through an inverter 310 to the two's complementor 306.

There has accordingly been described and shown a novel, useful and unique system for increasing the rate at which motion command signals are obtained from a contour generator, without increasing the rate of the input and which may exceed the input signal rate.

What is claimed is:

1. In a numerical control machine tool system of the type wherein a feedrate generator output drives a contour generator, the output of which is applied to drive a motor, said feedrate generator and said contour generator each including a digital differential integrator having an integrand register, an accumulator register, and an adder for adding the contents of said integrand register and accumulator register as they are entered into said adder least significant bit first, said integrand register contents being circulated back therein and there being a means for entering the sum from said adder into said accumulator register most significant bit end, means for entering a feedrate number into said feedrate integrand register means for entering an axis command number into said contour generator integrand register, the improvement comprising:

means for determining when a zero bit following a most significant one bit in a binary number in said feedrate integrand register is being applied to said adder and providing an output signal representative thereof, means for deriving an overflow bit from said feedrate adder responsive to said output signal, means responsive to said overflow bit for causing said contour generator digital differential integrator to go through an iteration cycle responsive thereto, a shift register having a predetermined bit capacity, means operative a predetermined time after the occurrence of said output signal for entering bits from the output of said contour generator adder into said shift register up to its bit capacity instead of entering them into said contour generator accumulator, means for shifting out the contents of said shift register as an overflow output before it receives another output from said contour generator adder, and means for utilizing the overflow output of said shift register for driving said motor.

2. In a numerical control machine tool system as recited in claim 1 wherein said means for determining when a zero bit following a most significant one bit in a binary number in said integrand register is being applied to said adder and providing an output signal representative thereof includes a first counter means having a count capacity equal to the bit capacity of said integrand register, means operative while said integrand register circulates its contents for advancing the count in said first counter means by one for each zero bit and resetting said first counter means to zero for each one bit to count the number of leading zeros in the binary number in said integrand register, means for advancing the count by one in said first counter means as each bit in the number in said integrand register is being applied least significant bit first to said adder, and means for providing said output signal when said first counter means overflows.

3. In a numerical control machine tool system as recited in claim 2 wherein said means operative a predetermined time after said overflow bit is derived from said adder includes a second counter means having a count capacity equal to the bit capacity of said integrand register, means for entering the complement of the count in said first counter means into said second counter means, means for advancing the count by 1 of said second counter means as each binary bit in said contour generator integrand and accumulator registers are entered into said adder to be added starting with least significant bits first, and means operative when said second counter means has attained a predetermined count to enter bits from said adder into said shift register instead of into said contour generator accumulator.

4. In a numerical control machine tool as recited in claim 1 wherein said means for utilizing the output of the shift register for driving said motor includes:

a down counter shift register, means for entering into said downcounter shift register said axis command number while it is being entered into said contour generator integrand register, and means for applying said overflow output of said shift register to drive said motor while reducing the number in said downcount shift register by said overflow output.

5. In a numerical control system as recited in claim 1 wherein a rapid traverse operation is desired, means for replacing the binary number in said feedrate generator integrand register with a rapid traverse code number, means responsive to said code number for generating an output signal at a predetermined time after said rapid traverse code number is commenced to be entered into said feedrate generator adder, counter means responsive to said rapid traverse code and said output signal to establish a count therein of the number of leading zeros in the command number in said contour generator integrand register, means to advance the count of said counter means in synchronism with the recirculation of the number in said integrand register during iteration of said contour generator, means responsive to a predetermined count of said counter means for enabling said means for entering bits into said register from said contour generator instead of into its accumulator register.

6. In a numerical control machine tool system of the type wherein a feedrate generator output drives a contour generator for each axis of motion, the output of which drives a motor for each axis of motion, said feedrate generator and said contour generator for each axis each comprising a digital differential integrator, each having an integrand register, an accumulator an a adder for adding the content of said integrand and accumulator registers as they are entered therein least significant bit first, said integrand register contents being circulated back therein, means for entering the sum from said adder into the accumulator register most significant bit position, means for entering a feedrate number into said feedrate integrand register, and means for entering an axis command number into each said contour generator integrand register, the improvement comprising:

means for determining when a zero bit following a most significant one bit in the number in said feedrate generator integrand register is being applied to its adder and producing an indicative output signal, means for deriving an overflow bit from said adder responsive to said output signal, means responsive to said overflow bit for causing said contour generators for each axis to go through an iteration cycle responsive thereto, a shift register for each axis having a predetermined capacity, means for each contour generator operative a predetermined time after said output signal for entering bits from the output of each axis contour generator adder into such axis shift register up to its capacity instead of into each axis contour generator accumulator, means for shifting the contents of each axis register out as an overflow output before a succeeding output is received from the contour generator adder, means for applying each axis overflow output to drive each axis motor, means for storing each axis command number, means for decrementing each stored axis command number by the overflow output applied to drive each axis motor, and means to specify a new axis command number or terminate operation when the stored axis command number reaches zero.

7. In a numerical control system as recited in claim 6 wherein for circular interpolation there is included:

means for generating the two's complement of the overflow output from one axis, means for adding said two's complemented overflow output to the number in the contour generator integrand register of another axis, and means for subtracting the overflow output of said another axis from the number in the contour generator integrand axis of said one axis.

8. In a numerical control system as recited in claim 6 wherein said means for determining when a zero bit following a most significant one bit in the number in said feedrate generator integrand register is being applied to its adder and producing an indicative output signal includes, a first counter means having a count capacity equal to the bit capacity of said integrand register, means operative while said integrand register circulates its contents for advancing the count in said first counter means by one for each zero bit and resetting said first counter means to zero for each one bit in said number in said integrand register to count the number of leading zeros in said number, means for advancing the count by one in said first counter means as each bit in the number in said integrand register is being applied least significant bit first to said feedrate generator adder, and means for providing an output signal when said first contour means overflows.

9. In a numerical control machine tool system as recited in claim 8 wherein said means operative a predetermined time after said overflow bit is derived from said adder includes a second counter means having a count capacity equal to the bit capacity of said integrand register, means for entering the complement of the count in said first counter means into said second counter means, means for advancing the count by 1 of said second counter means as each binary bit in said contour generator integrand and accumulator registers are entered into said adder to be added starting with least significant bits first, and means operative when said second counter means has attained a predetermined count to enter bits from said adder into said shift register instead of into said contour generator accumulator.

10. In a numerical control system as recited in claim 5 wherein a rapid traverse operation is desired, means for replacing the binary number in said feedrate generator integrand register with a rapid traverse code number, means responsive to said code number for generating an output signal at a predetermined count of said first counter means, means responsive to said rapid traverse code number for enabling said second counter means to count the number of leading zeros after the most significant bit in the largest of the axis command numbers, means to thereafter advance the count of said second counter means in synchronism with the recirculation of the number in each of the axis contour generator integrand registers during iteration of said contour generators, and means operative when said second counter means has reached a predetermined count to enable said means for each contour generator for entering bits into the respective contour generator shift registers from the respective adders instead of into the respective accumulator registers.

* * * * *

PO-1050
(5/69)

UNITED STATES PATENT OFFICE
CERTIFICATE OF CORRECTION

Patent No. 3,649,899     Dated March 14, 1972

Inventor(s) Ernst Dummermuth

It is certified that error appears in the above-identified patent and that said Letters Patent are hereby corrected as shown below:

Column 2, Line 13 — "should" should read --would--

Column 3, Line 18 — "sum" should read --$\overline{\text{sum}}$--

Column 4, Line 14 — "to" should read --TO--

Column 5, Line 61 — "whose" should read --whole--

Column 6, Line 61 — In the table under the column "Differ", the second "0" from the top should read --1--

Column 8, Line 65 — Delete "a" after --data--

Column 10, Line 39 — "and" should read --AND--

Column 10, Lines 69-73 — "The repetition rate assumed by way of example for this system is 35.714KHz. (1/28 places) introduces a multiplication by μsec). The feedrate generator (normalized 18 by 127/128 and the two-bit overflow with an integrand filled with all ones from its MSB downwards introduces a multiplication by 4." should read --The repetition rate assumed by way of example for this system is 35.714 KHz (1/28μ sec). The feedrate generator (normalized 18 places) introduces a multiplication by 127/128 and the two bit overflow with an integrand filled with all ones from its MSB downwards introduces a multiplication by 4.--

Signed and sealed this 15th day of May 1973.

(SEAL)
Attest:

EDWARD M. FLETCHER, JR.
Attesting Officer

ROBERT GOTTSCHALK
Commissioner of Patent